March 13, 1962 J. HUMBERT ETAL 3,025,156
METHOD AND APPARATUS FOR CONTINUOUSLY TREATING
POWDER COMPOSITIONS SUCH AS POWDER METALS
Filed May 20, 1958 2 Sheets-Sheet 1

INVENTORS
Jacques Humbert
Jacques Dubuisson
Claude Moranville
BY Bacon & Thomas
ATTORNEYS March 13, 1962 J. HUMBERT ETAL 3,025,156
METHOD AND APPARATUS FOR CONTINUOUSLY TREATING
POWDER COMPOSITIONS SUCH AS POWDER METALS
Filed May 20, 1958 2 Sheets-Sheet 2

INVENTORS
Jacques Humbert
Jacques Dubuisson
Claude Moranville
BY
Bacon & Thomas
ATTORNEYS United States Patent Office 3,025,156
Patented Mar. 13, 1962

3,025,156
METHOD AND APPARATUS FOR CONTINUOUSLY TREATING POWDER COMPOSITIONS SUCH AS POWDER METALS
Jacques Humbert, Saint Martin la Garenne, Seine, Jacques Dubuisson, Paris, and Claude Moranville, Chatenay Malabry, Seine, France, assignors to Commissariat a l'Energie Atomique, Paris, France
Filed May 20, 1958, Ser. No. 736,609
Claims priority, application France May 20, 1957
8 Claims. (Cl. 75—84.1)

This invention relates to the treatment of powder compositions at elevated temperature, and particularly to the production of powder metals having high chemical affinity for oxygen and other elements. Uranium and thorium are notable instances of such metals.

The preparation of such metals in powder form is beset with difficulties. Conventional methods for this purpose generally comprise mixing a suitable compound of the desired metal, such as an oxide or a chloride of it, with a powerful reducing agent, for example aluminium, magnesium or calcium. The operation must be carried out in a strictly inert atmosphere to avoid pollution of the metal and reaction with extraneous agents. Strictly identical operating conditions must be reproduced if a uniform final product is to be obtained.

The apparatus generally used in manufacturing plants for carrying out such conventional processes are mere extensions of laboratory apparatus. Examples of such apparatus are shown in FIGS. 1, 2 and 3 of the accompanying drawings. Thus FIG. 1 illustrates a sealed pressure container made of steel and the steel walls of which are isolated from the reagent mass by a suitable protective lining of metal or refractory compound. An excess of the reducer agent serves in part to purify the atmosphere within the container. In the apparatus shown in FIG. 2 a removable cover is provided and a pair of tubes extending through the cover are used for circulating a conditioned gaseous atmosphere through the reactor. FIG. 3 shows another conventional apparatus in the form of a bell in which a heated container holding the reagent mass is placed, inlet and outlet tubes being provided for circulating a selected inert gaseous atmosphere through the bell.

The use of apparatus of any of the above types for large scale production purposes has considerable drawbacks. The dimensions of the reactor cannot be greatly increased without danger to the operating personnel. The operating procedure involved is of a discontinuous character and comparatively small batches of material are treated at a time, thereby greatly multiplying the number of separate apparatus and operating stations required if large quantities of material are to be treated, correspondingly increasing the costs. In large sized apparatus a considerable temperature gradient is present within the reaction mass, leading to non-uniform particle size in the final product.

An object of this invention is to provide a process and apparatus for producing powder metals in which the above drawbacks are eliminated. Other objects are to enable continuous preparation of powder metals, and to provide a continuous process for this purpose wherein a close control of the reaction atmosphere can easily be maintained, wherein a substantially uniform temperature can be maintained throughout the reaction mass, and which will lead to the production of more uniform and superior powder metal compositions.

According to the method of the invention, a reagent mass is prepared in the form of separate small cakes compressed under high pressure. The cakes are placed in crucibles and these are fed over a continuous processing path in which they are exposed in succession to de-aerating conditions, then to cooling in an inert atmosphere, heating to a temperature above 500° C., followed by further cooling.

Apparatus for carrying out this continuous process may comprise a set of crucible-like containers arranged to interfit with one another so as to provide a rigid vertical column, and means for displacing said column in an axial or vertical downward direction through a plurality of stations, including part or all of the following stations, in descending order: an air-lock provided with gas-tight seals and enclosing an airlock chamber, means being provided for connecting said chamber to a vacuum source; a cooling station; a heating station; and a final cooling station; means are further provided for introducing an inert atmosphere into and around the crucibles as they are passed through the above stations, and drive means for displacing the column at a controllable speed and for serially withdrawing the crucibles from the bottom end of the column, while causing the crucibles to retain a constant orientation in space.

According to one feature of the invention, part or all of the gas-tight seals used in the apparatus, including the seals of the airlock and the seal used for separating the second cooling station from the bottom withdrawing station, are self-centering pneumatic seals including sleeves of elastic material arranged to be resiliently applied against the sides of the crucibles by a compressed gas, such as the neutral gas used.

In a preferred construction, the frame of the apparatus comprises a vertical tubular casing and each seal is provided in the form of an elastic, e.g. rubber, sleeve having its ends secured to the casing wall and extending within said wall so as to define an annular space with it. A neutral gas, such as argon, is delivered under pressure into the said annular space so that the rubber sleeve is applied inwardly against the generally cylindrical wall of the stack of crucibles travelling through the apparatus. Since the pressure is uniform all around the sleeve this arrangement simultaneously serves to center the crucibles. The use of an inert gas such as argon is preferred in applying the seals in order to guard against the possibility of a leak occurring in a seal.

According to another feature of the invention the driving and output station at the base of the apparatus may comprise a set of rollers or drums having peripheral grooves conforming with the contours of the stack of crucibles. Each roller consists of an alternating stack of discs made of elastic material and metal discs, and means are provided for applying the rollers against the crucibles to prevent slippage of the crucibles and also to control their downward movement at the desired rate, means being provided for driving the rollers at a predetermined velocity.

Gas tight seals may be set just before the driving and output station.

The crucibles used according to the invention are desirably formed with vent holes for permitting a free flow of gas through them, and refractory plates may be placed in the crucibles as supports for the reagent charges.

The cooling means are arranged to surround the heating station or furnace, i.e. one is positioned above the furnace and the other below it, so as to provide thermal barriers which limit the sections of the appparatus throughout which variable temperatures obtain. This is of especial interest in connection with the starting of the reaction since the starting temperature must be both relatively high, and uniform. In this way a product of uniform chemical and granulometrical composition is produced. Moreover, the upper cooling device serves to protect the airlock against heat from the furnace.

If desired a further airlock may be provided at the lower end of the apparatus ahead of the driving and output station, in order to recover the gases contained in the crucibles.

The method and apparatus of the invention possess a number of advantages over conventional methods and apparatus for the preparation of powder metals. Since each crucible contains a comparatively small amount of material, a homogeneous initial mixture is easily obtained. Owing to the provision of the heat barriers or screens identical conditions are easily reproducible in all of the crucibles thereby ensuring uniform characteristics in the final product. Comparatively high outputs are yet obtainable with a single operating station. Strictly inert atmosphere can easily be maintained for avoiding pollution and secondary reactions with external agents, as a result of the gas-lock.

An exemplary embodiment of apparatus according to the invention will now be described for purposes of illustration but not of limitation with reference to FIGS. 4 to 8 of the accompanying drawings, wherein.

Figure 1:
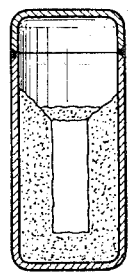
Figure 2:
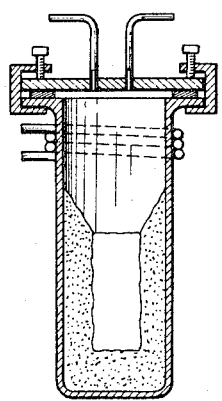
Figure 3:
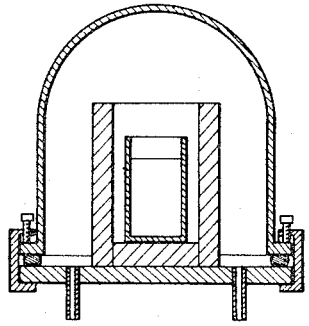

It will be understood that the drawings are highly simplified with only elements essential or important in understanding the invention being shown. In the general view of FIG. 1, the stack of crucibles is shown in outline as the vertical cylinder 9. This stack is contained and guided in its downward vertical movement by means of an outer vertical tubular body comprising a plurality of flanged tubular sections assembled together in any suitable, removable manner as by means of bolts, not shown.

Broadly speaking the apparatus comprises, from top to bottom, an input section including an airlock 1 arranged intermediate the two seal means 2 and 3, an initial cooler 4, a heating zone or furnace 5, a final cooler 6, an output seal 7 and a driving and output station 8.

The input or airlock section comprises a lock chamber 10 connectable by a suction line 11 with a suitable source of vacuum, not shown. In the tubular body section overlying the section comprising the vacuum chamber is a first seal 2, which comprises a sleeve 12 of elastic material having its ends clamped between the mating flanges at the top and bottom of the tubular section 12, and a line 14 connectible with a source of pressure gas such as argon is connected with the annular space between the tubular body section and the outer surface of sleeve 12 as previously mentioned. Similarly the tubular body section below vacuum chamber 1 comprises a sealing sleeve 13 and a pressure gas connection 15, the arrangement being similar to that just described. The detailed operation of the sealing means will be described with reference to FIG. 6.

The cooling unit 4 may be of any conventional type and is shown as having an inlet 16 and an outlet 17 for coolant fluid such as water.

The heating unit 5 may likewise be of any suitable type, using electric energy or fuel combustion, and is suitably heat-isolated from the surrounding atmosphere. The heating device is of generally annular shape and surrounds an intermediate portion of the tubular casing of the apparatus. The axial length of the heater device need not be very great since the reaction initiating temperature is rapidly attained in view of the relatively small amount of material in each crucible, and once such temperature has been attained the reaction proceeds practically instantaneously.

The final cooling unit 6 may be of similar type to the cooler 6 with an inlet 18 and an outlet 19 for the coolant, e.g. water, but is shown of greater axial extent than the upper cooler since the lower cooler is traversed by the heated crucibles from the furnace and therefore has a good deal more heat to dissipate. The downward velocity of the stack of crucibles is adjusted in view of the heat dissipating capacity of the cooler, the temperature of the furnace and the heat capacity of the charge of the crucibles, so that the temperature in the crucibles has dropped down substantially to normal as the crucibles move past the lower end of the cooler.

Connecting with the tubular body above the initial cooler unit 4 and below the final cooler unit 6, respectively, is an inlet 20 and an outlet 21 for inert gas, such as argon, circulated by means of any suitable gas flow system.

A lower seal is provided at 7 and may be similar to the upper seals 1 and 2 described above. The driving and output system 8 will be described with reference to FIGS. 7 and 8.

Figure 5:
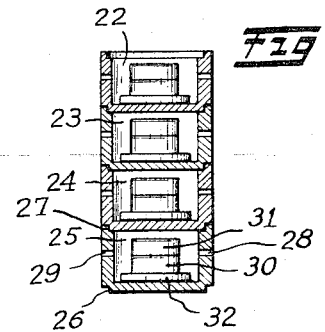
FIG. 5 is a larger scale cross sectional view showing in greater detail a portion of the stack of crucibles.

Referring now to FIG. 5, part of the stack of crucibles 9 is shown, comprising the four identical crucibles 22, 23, 24 and 25 assumed to be filled with a charge of powder composition. The crucibles may be made from stainless steel or any other metal capable of resisting attack at the high temperatures involved. Each crucible, such as the bottom crucible 25 in FIG. 5, is formed with a shoulder 26 near its bottom and a projection 27 near its top to permit firm internesting engagement between the adjacent crucibles and provide a relatively rigid, self-supporting stack. Vent passages 28 and 29 are formed through the walls of the crucible for circulation of the inert gas therethrough.

The base of each crucible supports a disc 32 made of suitable refractory material, such as CaO, MgO or a refractory metal such as molybdenum or tantalum. Placed on the base plate 32 of each crucible are one or more (two shown) cakes of reagent mixture such as 30 and 31, each such cake being compressed under a high pressure of say one metric ton per square centimeter.

Figure 4:
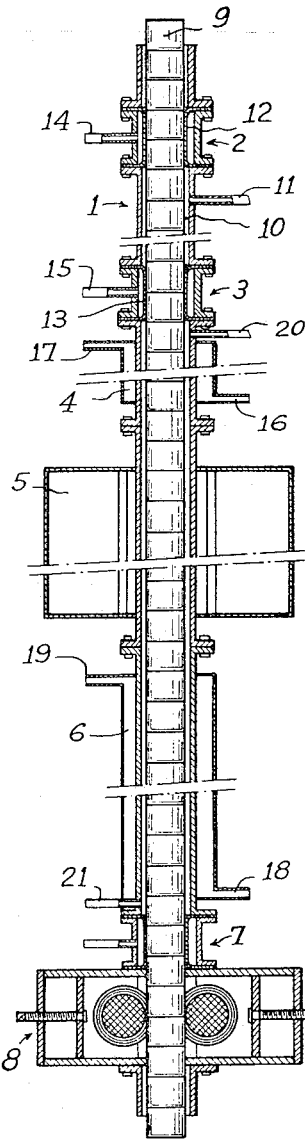
FIG. 4 is a vertical cross section of the apparatus.
Figure 6:
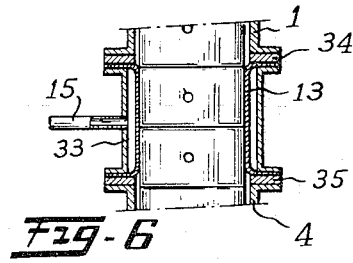
FIG. 6 is a similar view of a centering seal.

FIG. 6 illustrates in detail one of the centering sleeve seals such as 2, 3 or 7 in FIG. 4, e.g. the seal 3. The seal assembly comprises a sleeve 13 made of a suitable elastomer such as rubber having its upper and lower ends clamped between the related end flange of the tube section shown at 33, and an annular insert ring 34 or 35 is inserted between the mating flanges of adjacent tubular sections. Flat headed screws, not shown, may be used to clamp the sleeve ends in position. When pressure gas, e.g. argon, is delivered through the inlet 15 into the annular space defined between the tubular wall 33 and the sleeve 13 the sleeve is applied under radially inward pressure against the generally cylindrical surface of the stacked crucibles. Because of the flexibility of the sleeve it fits tightly around said surface preventing ingress of air. At the same time the circumferentially uniform pressure applied by the sleeve acts automatically to center the crucibles.

Figure 7:
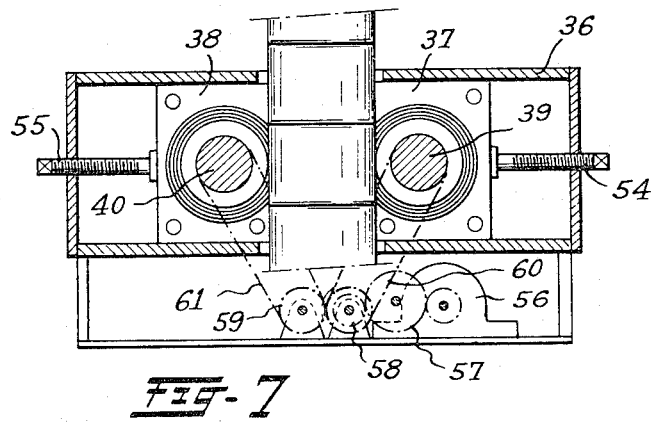
FIG. 7 is a similar view of the driving and output station at the bottom of the apparatus.
Figure 8:
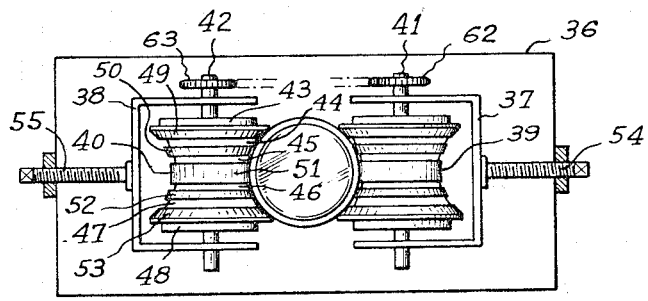
FIG. 8 is an overhead view in horizontal section showing the driving and output station of FIG. 7.

The output station 8 is shown in greater detail in FIGS. 7 and 8 and comprises a frame 36 having supports 37 and 38 secured in it, with a pair of drums or rollers 39 and 40 journalled in the respective supports on either side of the stack of crucibles. It will be noted from FIG. 4 that the rollers 39 and 40 engage the stack of crucibles 9 below the lower end of the tubular body. The rollers 39 and 40 are formed with the concave profiles shown so as to conform to the cylindrical surface of the stacked crucibles. Each roller comprises an alternating stack of steel discs 43, 44, 45, 46, 47 and 48 and elastomer discs 49, 50, 51, 52 and 53, made e.g. of neoprene, providing a fast grip on the crucibles and preventing the stack from slipping downward by gravity. The roller supports 37 and 38 are slidably mounted on the frame 36 for movement towards and away from the stack of crucibles between them, and can be secured in an adjusted position as by means of the screw rods 54, 55 relatively to the frame 36.

The rollers 39 and 40 are rotated at equal speeds from a motor 56 supported in the base of frame 36 and driving through a reducer gearing 57, sprockets 58 and 59 and sprocket chains 60 and 61, the upper ends of which are trained around sprockets 62 and 63 secured on the roller axles 41 and 42.

Apparatus constructed as thus described may be utilized inter alia for the preparation of uranium and thorium by reduction of the dioxides thereof by metallic calcium. The general equations of the reactions involved is $$UO_2 + Ca \rightarrow U + 2CaO$$
$$ThO_2 + 2Ca \rightarrow Th + 2CaO$$

The reactions are practically instantaneous and are initiated in the range of from 750° C. to 800° C. if the surrounding atmosphere is sufficiently pure.

The reagent mixture of the metal oxide and calcium, containing an excess of about 30% calcium, is compressed into cakes at a pressure of about 1 ton per sq. cm., and two such cakes representing about 300 grams of uranium or thorium are placed in each crucible over a base plate of lime sintered at 1600° C.

Each such reaction mass as issuing from the apparatus is ground and then washed at low temperature in 4 N acetic acid. This may be effected in large stainless steel tanks provided with brine circulation and agitator means.

The powder is then washed in a deoxidizing bath of 4 N sulfuric acid, drained, filtered and dried in vacuo.

In the case of uranium the powder should before the drying step be coated with a protective lining of paraffin or electro-chemically plated metal.

The yield of the process is about 97%.

Powder metals produced by this method have been found to have the following characteristics:

|  | Uranium | Thorium |
| --- | --- | --- |
| Average grain diameter, microns | 15 | 20 |
| Impurity content, in parts per 1,000: |  |  |
| Ca | 150 | 150 |
| B | 0.2 | 0.2 |
| Cr | 5 | 5 |
| Cu | 25 | 25 |
| Fe | 50 | 80 |
| Mn | 4 | 6 |
| Ni | 5 | 4 |
| Si | 50 | 100 |
| Al | 100 | 100 |

What we claim is:

1. Apparatus for producing powdered metals comprising a substantially tubular casing adapted to receive a rigid column of stacked crucibles at one end thereof for discharge at the other end, and means for supporting said column within said casing and permitting movement of said column through said casing, said casing including successively, in the direction of movement of said column, a first annular seal between said column and the inner wall of said casing, a connecting pipe for evacuating air from the space immediately downstream of said first seal, a second annular seal between said column and the inner wall of said column, a connecting line for introducing a protective gas into said casing downstream of said second seal, a first cooling unit, a furnace, a second cooling unit, a connecting line for discharging said protective gas, and a third seal between said column and the inner wall of said casing.

2. Apparatus as defined in claim 1 wherein said seals comprise inflatable annular sleeves formed of elastic material.

3. Apparatus as defined in claim 1 wherein said means for supporting and permitting movement of said column comprises an opposed pair of controlled rollers each formed of a plurality of alternating discs of resilient material and of metal, the peripheries of said rollers being generally complementary in configuration to the peripheral surfaces of said crucibles, whereby said crucibles may be tightly gripped therebetween.

4. Apparatus as defined in claim 1 wherein said crucibles are substantially cup-shaped and are provided with inter-engaging top and bottom configurations whereby each crucible securely nests with the next adjacent crucible to form a rigid column, the side walls of said crucibles having vents provided therein.

5. In a process for continuously producing powdered metal from a pulverulent reagent mixture of the oxide of a metal selected from the group consisting of uranium and thorium, with calcium, the steps of compressing the mixture into a multiplicity of cakes, placing the cakes into a plurality of crucible-like receivers stacked into a self-supporting column, and continuously feeding the receivers into and through a sealed tubular enclosure past an initial cooling station, a heating station, and a final cooling station arranged in said enclosure and so selecting the feed rate that said receivers are substantially cooled to normal ambient temperature as they issue past said final cooling station.

6. A process for continuously producing a powdered metal selected from the group consisting of uranium and thorium, comprising continuously feeding a compressed powdered mixture of an oxide of said metal and a metallic reducing agent in an inert atmosphere successively through a cooling zone, through a zone heated to at least 500° C. to cause said oxide to be reduced to said powdered metal, and then through a second cooling zone, the rate of feeding of said compressed mixture being regulated so that said mixture remains in said heating zone for a time sufficient to effect complete reduction of said metal oxide.

7. The process of claim 6 wherein said metallic reducing agent is calcium.

8. The process of claim 6 wherein said mixture is fed in successive, individually contained batches, each batch closely following the next preceding batch through said zones.

References Cited in the file of this patent
UNITED STATES PATENTS

| | | |
|---|---|---|
| 1,714,767 | Cousin | May 28, 1929 |
| 1,925,292 | Walter | Sept. 5, 1933 |
| 2,386,073 | Stewart | Oct. 2, 1945 |
| 2,422,439 | Schwarzkoph | June 17, 1947 |